June 26, 1956     L. J. REVALLIER     2,752,225
METHOD OF PREPARING NITRATING ACIDS
Filed April 21, 1953
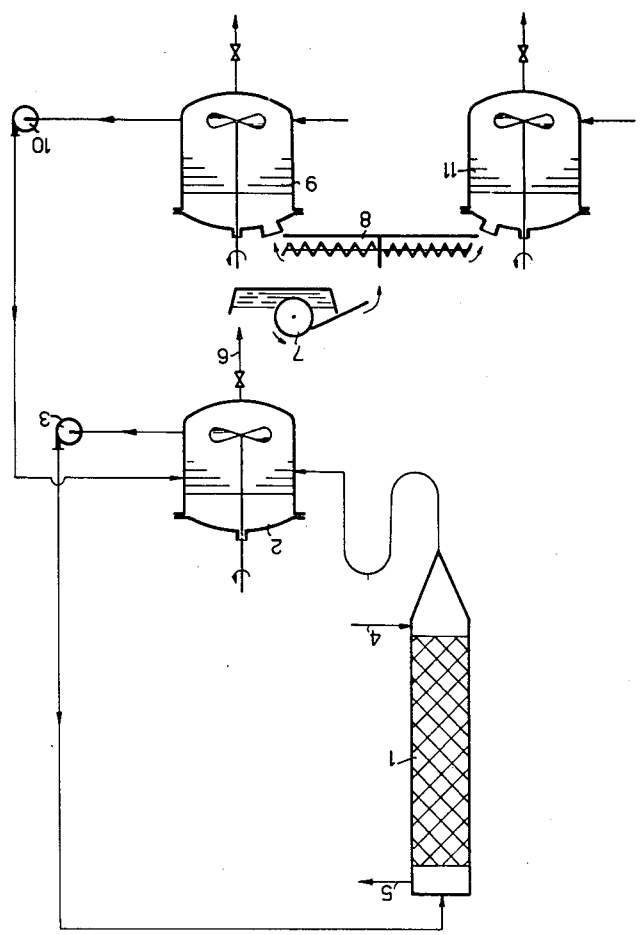
INVENTOR
LEONARDUS J. REVALLIER
By Cushman, Darby & Cushman
ATTORNEYS United States Patent Office 2,752,225
Patented June 26, 1956

2,752,225

METHOD OF PREPARING NITRATING ACIDS

Leonardus J. Revallier, Geleen, Netherlands, assignor to Stamicarbon N. V., Heerlen, Netherlands Application April 21, 1953, Serial No. 350,189

Claims priority, application Netherlands April 25, 1952

5 Claims. (Cl. 23—114)

The present invention relates to a method of preparing nitrating acids, i. e., mixtures of nitric acid and sulfuric acid or oleum which are suitable for effecting nitrating reactions. Preferably, these nitrating acids should contain an excess of sulfur trioxide not bound to water in addition to the nitric acid and the sulfuric acid.

A simple and direct method of preparing nitrating acids is described in British patent specification 524,531. Specifically, this British patent describes a method which involves the absorption of $SO_3$ or $SO_3$-containing gases in nitric acid or mixed acid already available, preferably by passing these materials through a scrubber in countercurrent relationship, while cooling sufficiently to prevent nitric acid vapors from escaping.

The preparation of nitrating acids as described in British Patent 524,531 suffers from several disadvantages. In the first place, very intensive cooling is necessary, because considerable heat is liberated by the reaction between $SO_3$ and $HNO_3$. The desired cooling may be effected by allowing relatively little $SO_3$ to be absorbed per unit of volume of absorption liquid and repeating the operation to achieve the desired absorption. This, of course, is not particularly desirable.

Another disadvantage of the procedure described in British Patent 524,531 is that the desired nitrating acids can only be prepared if virtually pure $SO_3$ is available. Thus, contact gas, which contains nitrogen and oxygen, in addition to 6% to 8% by volume of $SO_3$, is not suited for the preparation of nitrating acids in the process of British Patent 524,531. This is due to the fact that the nitrogen and oxygen present in the contact gas and which are not absorbed by the absorption liquid containing nitric acid, entrain nitric acid vapors from the absorption liquid thereby causing serious losses of nitric acid even when cooling is employed.

Although not specifically disclosed in the above mentioned British patent, it is possible to absorb $SO_3$ in a circulating mixed acid from contact gas according to the method described therein. When this is done, the circulating mixed acid must have a very low $HNO_3$ vapor pressure. This is only the case with mixed acids which contain, in addition to free $SO_3$, relatively little $HNO_3$, e. g., less than 20% of $HNO_3$. Such a mixed acid has too high an $SO_3$ content in proportion to its $HNO_3$ content to permit its use as a nitrating acid because such a high $SO_3$ content causes side reactions, such as carbonization or sulfonation, to occur.

If it should still be desired to prepare nitrating acid from mixed acids containing relatively little $HNO_3$, by addition of concentrated $HNO_3$ to increase the proportion of $HNO_3$ to $SO_3$, the difficulty is encountered that great quantities of heat are released, so that, in spite of proper cooling, loss of nitric acid due to decomposition will occur.

It has now been found that such free $SO_3$ containing nitrating acids having a content of, for example, 40% or more of $HNO_3$ can be prepared without difficulty with respect to cooling requirements and losses of nitric acid through decomposition. Accordingly, the provision of a process for preparing nitrating acids with the above mentioned advantages is the principal object of the invention although other objects, including novel improvements in the production of $(NO_2^+)$ $(HS_2O_7^-)$, are also contemplated.

Broadly stated, the production of nitrating acids is carried out, according to the present invention, by a process which comprises dissolving solid mixed acid of the composition $(NO_2^+)$ $(HS_2O_7^-)$ in concentrated nitric acid.

The success of the invention is due, at least to a large extent, to the discovery that in dissolving solid crystals of the product $(NO_2^+)$ $(HS_2O_7^-)$ in nitric acid, the heat of reaction is, to a large extent, compensated by the heat consumed by the crystals when they melt during dissolution.

The fact that these solid crystals can be dissolved in nitric acid without difficulty as far as the cooling and decomposition of nitric acid are concerned can be utilized with advantage in preparing the above mentioned solid crystals of the composition $(NO_2^+)$ $(HS_2O_7^-)$.

As far back as 1912 W. Schultze described in United States specification No. 1,047,576 the preparation of the crystalline compound, which he indicated by the formula $N_2O_5(SO_3)4.H_2O$. However, recent roentgenographic investigations have shown that the compound is composed of $NO_2^+$ and $HS_2O_7^-$ ions. Accordingly, the formula $(NO_2^+)$ $(HS_2O_7^-)$ should be preferred to the old formula $N_2O_5(SO_3)4.H_2O$ given the crystalline compound described in the above mentioned United States Patent No. 1,047,576.

The Schultze method of preparation consists in the absorption of $SO_3$ gas in a liquid mixture of concentrated nitric acid and oleum in which the molar ratio between $SO_3$ and $N_2O_5$ is about 4, the liquid mixture being maintained at a temperature of over 100° C. during the absorption. At the same time a flow of concentrated nitric acid is supplied to the absorption liquid as $N_2O_5$ make-up in such an amount that per unit of time the ratio between the quantities of $SO_3$ and $N_2O_5$ introduced, expressed in grammoles, is maintained at a value of about 4. Hot concentrated liquid is removed continuously, from which, after cooling, the solid product crystallizes out and is separated from the mother liquor by suction filtration.

The Schultze method of preparation has the serious disadvantage that the addition of concentrated nitric acid to the absorption liquid, which is kept at a temperature of over 100° C., causes loss of nitric acid due to partial decomposition thereof.

Presumably, this is the reason why the Schultze process has never been carried out on a technical scale, no commercial uses having been found for the crystalline product $(NO_2^+)$ $(HS_2O_7^-)$ to the present time, in spite of its favorable properties such as high thermal stability and low vapor pressure.

I have discovered that addition of $N_2O_5$ make-up to the $SO_3$-absorbing liquid can be accomplished without serious loss of nitric acid due to decomposition thereof by continuously supplying $N_2O_5$-containing liquid to the absorbing liquid, which is kept at over 100° C., said $N_2O_5$-containing liquid being a nitrating acid and preferably consisting essentially apart from 0% to 2% of water, of a mixture of 35 to 50 parts by weight of $SO_3$ and 65 to 50 parts by weight of $HNO_3$. The utilization of such $N_2O_5$ make-up liquids has the great advantage that there is practically no decomposition of nitric acid at temperatures of from 100–120° C. It was found that when these $N_2O_5$-make-up liquids were maintained at temperatures of from 100–120° C. for half an hour, the nitrite content (a measure of the degree of decomposition) only rose from 0.4 to 1.2% of $N_2O_3$. Concentrated nitric acid could not be heated to this extent, owing to decomposition.

Preferably, the absorbing liquid is continuously recirculated through the absorbing tower and the $N_2O_5$-make-up liquid is prepared by dissolving part of a previous production of the crystalline compound in nitric acid.

Also, the $HNO_3$ vapor pressure of the make-up liquids in question is relatively low, as a result of the fact that, in contradistinction to nitric acid, the $HNO_3$ in the make-up liquid is, to a great extent, present in a stable form (due to the formation of nitronium ions according to the equation $HNO_3 + SO_3 \rightleftharpoons NO_2^+ + HSO_4^-$). Whereas 100% $HNO_3$ boils at 83° C., the $HNO_3$ vapor pressure of a liquid consisting of 35 to 50 parts of $SO_3$ and 65 to 50 parts of $HNO_3$ is only 0.1 to 0.3 atm. at 100° C. This low $HNO_3$ vapor pressure greatly reduces $HNO_3$ losses during the preparation of the solid nitrating acid.

A preferred method of preparing liquid and solid nitrating acids according to the invention will be explained with the help of the accompanying drawing in which the process of the invention and the equipment employed is represented diagrammatically.

In the drawing, 1 represents an absorption column filled with packing material, through which the absorption liquid is circulated continuously via a buffer tank 2 and a pump 3. The contents of the buffer tank may be kept at a temperature of 110–120° C. by means of suitable heating appliances (not shown), e. g., electrically heated steam coils.

At the bottom of the column is the supply conduit 4 for the $SO_3$-containing gas; at the top of the column is a gas delivery conduit 5 for the removal of the non-absorbed gases.

The buffer tank 2 is provided with a stirrer 12, a supply conduit for the $N_2O_5$-make-up liquid 13 and a discharge conduit 6 for the product formed by the reaction between $SO_3$ and $N_2O_5$-make-up liquid, which product is still liquid at a temperature of 110–120° C.

The discharge conduit 6 debouches into a vessel 14 provided with a drum cooler 7. The solid product crystallizes upon the drum cooler from which it is removed in the form of crystal flakes by means of a doctor blade 15.

Part of the crystal mass produced is introduced into a reservoir 9 provided with a stirrer 16 and a cooling coil (not shown in the drawing). Transport of the crystals is effected by a conveyor screw 8. Sufficient concentrated nitric acid is continuously supplied to the reservoir 9 to produce a nitrating acid, consisting of 35–50 parts of $SO_3$, 65–50 parts of $HNO_3$ and 0–2% of $H_2O$. Part of this nitrating acid is supplied as $N_2O_5$ make-up to the buffer tank 2, via pump 10. The reservoir 9 is provided with a discharge conduit 17 through which the remaining amounts of nitrating acid, if any, may be drained.

A specific example illustrating operation of the process of the invention is now presented.

Per hour 100 m.³ of contact gas containing 7% by volume of $SO_3$ was introduced into the column; of this amount per hour 200 kg. of $SO_3$ were absorbed in an absorption liquid composed of 70% of $SO_3$, 29% of $HNO_3$ and 1% of $H_2O$, while e. g., 4000 kg. per hour were circulated by pumping via reservoir 2 and pump 3; 25 kg. of non-absorbed $SO_3$ were discharged via discharge opening 5, together with the residual gases.

An amount of 240 kg. per hour of $N_2O_5$ make-up liquid was furthermore supplied to reservoir 2 in a continuous current (composition: 45% of $SO_3$, 53% of $HNO_3$, 2% of $H_2O$), while via discharge conduit 6 440 kg. per hour of melted substance was conveyed to the drum cooler. 155 kg. per hour of the crystallized product obtained from the drum cooler was introduced into reservoir 9, which at the start of the process was filled with make-up liquid of the composition given above. Moreover, an amount of 85 kg. per hour of 97% $HNO_3$ was supplied to reservoir 9.

The total amount of crystalline product produced per hour was 285 kg., recovered from 100 m.³ of contact gas and 85 kg. of 97% $HNO_3$.

The total heat of reaction liberated in the reaction between this $SO_3$ and nitric acid is, in the process according to the invention, removed at four points, viz. on the drum cooler 7, in the reservoirs 2 and 9 and by radiation in the absorption column 1.

Thus the heat of reaction is removed quickly and the process is exceptionally easy to regulate. Decomposition of nitric acid as a result of excessive temperatures is excluded.

The method described above is also suited for the production of a high-grade nitrating acid consisting of 35–50 parts of $SO_3$ and 65–50 parts of $HNO_3$; e. g., when, operating under the same conditions all of the crystals removed from the drum cooler were dissolved in reservoir 9, while adding at the same time 243 kg. of 97% $HNO_3$ per hour, it was possible to remove from reservoir 9, 443 kg. of high-grade nitrating acid per hour, said acid consisting of 45% of $SO_3$, 53% of $HNO_3$ and 2% of $H_2O$.

Furthermore, it is also possible to dissolve the solid crystals in nitric acid in a separate reservoir 11; in this manner nitrating acids of widely varying compositions may be obtained without great rises in temperature occurring.

In this way a high-grade nitrating acid was obtained by dissolving 80 kg. of crystalline $(NO_2^+)(HS_2O_7^-)$ in 25 kg. of 98% $HNO_3$. The resulting nitrating acid contained 54% of $SO_3$, 45% of $HNO_3$ and 1% of $H_2O$; during the dissolution the temperature rose from 20 to 40° C.

Likewise, a nitrating acid consisting of 66% of $H_2SO_4$ and 34% of $HNO_3$ was e. g. obtained by dissolving 100 kg. of crystalline $(NO_2^+)(HS_2O_7^-)$ in 31 kg. of 53% nitric acid. During this dissolution the temperature rose to 70° C., which temperature could easily be kept below 50° C. by cooling.

If the same nitrating acid were to be prepared by gradual addition of oleum to concentrated nitric acid, e. g., 60 parts of 60% oleum to 40 parts by weight of 86% $HNO_3$, a very strong rise in temperature occurs immediately, evolving $SO_3$ and nitric fumes and effecting a considerable loss of nitric acid by decomposition.

As understood by those skilled in the art, satisfactory common nitrating acids consisting of a mixture of sulfuric acid and nitric acid and containing apart from water from 80–60% $H_2SO_4$ and from 20–40% $HNO_3$ and free $SO_3$ containing nitrating acids consisting apart from 0–5% of water of a mixture of 60–35 parts of $SO_3$ and 40–65 parts of $HNO_3$ can be prepared and the term "nitrating acid" as used herein is intended to mean acids having the compositions encompassed above.

It will be appreciated that the proportions of crystalline $(NO_2^+)(HS_2O_7^-)$ to concentrated nitric acid used according to the present invention can be widely varied depending on such factors as the concentration of the nitric acid employed and the composition of the nitrating acid desired. However, generally speaking, it can be stated that from 100 to 400 kg. of $(NO_2^+)(HS_2O_7^-)$ per 100 kg. of concentrated nitric acid of 98% can be used satisfactorily.

If a nitric acid of 40–60% $HNO_3$ is used 400 to 700 kg. of $(NO_2^+)(HS_2O_7^-)$ per 100 kg. nitric acid has to be used in order to obtain a satisfactorily nitrating acid.

I claim:

1. In the process of producing solid crystalline $(NO_2^+)(HS_2O_7^-)$ which comprises supplying to an absorption liquid of about the same composition as the desired product maintained at a temperature above 100° C. an $SO_3$-containing gas and a liquid-containing nitric acid, the proportions of the supplied ingredients being adjusted to maintain a molar ratio of $SO_3:N_2O_5$ of about 4, withdrawing a portion of the absorbing liquid in an amount corresponding to the amount of supplied ingredients, and cooling the withdrawn liquid to crystallize $(NO_2^+)(HS_2O_7^-)$, the improvement which comprises employing as the liquid containing nitric acid which is supplied to the absorption liquid a mixture produced by dissolving crystalline $(NO_2^+)$ $(HS_2O_7^-)$ in concentrated nitric acid, said mixture consisting essentially of from 35 to 50 parts of $SO_3$, 65 to 50 parts of $HNO_3$ together with up to 2% water.

2. A process as recited in claim 1 in which the crystalline $(NO_2^+)$ $(HS_2O_7^-)$ produced by cooling and crystallizing the withdrawn liquid is employed as a part of the nitric acid containing liquid supplied to the absorption liquid.

3. A process as recited in claim 1 in which the $SO_3$ containing gas contains about 6–8% by volume of $SO_3$.

4. A process for the production of nitrating acid which comprises continuously absorbing $SO_3$ in a liquid mixture of about the same composition as the product $(NO_2^+)$ $(HS_2O_7^-)$ maintained at a temperature over 100° C., continuously supplying $N_2O_5$ make-up liquid consisting essentially from 35 to 50 parts $SO_3$ to 65 to 50 parts $HNO_3$ together with up to 2% by weight of the liquid mixture of water, the molar ratio of $SO_3$ absorbed to $N_2O_5$ supplied being about 4, continuously withdrawing a portion of the absorbed liquid in an amount corresponding to the amount of absorbed $SO_3$ and supplied $N_2O_5$, cooling said withdrawn liquid to crystallize $(NO_2^+)$ $(HS_2O_7^-)$ dissolving a portion of said crystals in concentrated nitric acid to produce the said $N_2O_5$ make-up liquid, and dissolving the remaining $(NO_2^+)$ $(HS_2O_7^-)$ in concentrated nitric acid to produce nitrating acid.

5. A process according to claim 1 wherein the dissolution is carried out at a temperature not above about 70° C.

References Cited in the file of this patent

UNITED STATES PATENTS

| 884,035 | Nield | Apr. 7, 1908 |
| 1,047,576 | Schultze | Dec. 17, 1912 |

FOREIGN PATENTS

| 524,531 | Great Britain | Aug. 8, 1940 |

OTHER REFERENCES

Heertjes et al., in Chemical Abstracts, vol. 44, col. 8809(g) (1950).